(12) United States Patent
Peri et al.

(10) Patent No.: US 6,182,208 B1
(45) Date of Patent: Jan. 30, 2001

(54) SYSTEM FOR DEBUGGING (N) BREAK POINTS BY DIVIDING A COMPUTER PROGRAM TO (N+1) REGIONS EACH CONTAINS NO BREAK POINT AND USING TWO REGISTERS TO DEFINE THE START AND END ADDRESSES OF EACH REGION

(75) Inventors: Ramesh V. Peri, Allentown; Sanjay Jinturkar, Bethlehem; Lincoln Fajardo, Kempton; Jay Wilshire, Pennsburg, all of PA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/134,182

(22) Filed: Aug. 14, 1998

(51) Int. Cl.[7] .................................................. G06F 15/00

(52) U.S. Cl. .............................. 712/227; 714/25; 714/35

(58) Field of Search .............................. 712/227; 714/25, 714/35

(56) References Cited

U.S. PATENT DOCUMENTS

| | | | |
|---|---|---|---|
| 4,675,646 | 6/1987 | Lauer | 340/146.2 |
| 4,866,665 | * 9/1989 | Haswell-Smith | 714/35 |
| 5,394,544 | 2/1995 | Motoyama et al. | 395/575 |
| 5,657,442 | * 8/1997 | Groves | 345/429 |
| 5,664,159 | 9/1997 | Richter et al. | 395/500 |
| 5,978,902 | * 11/1999 | Mann | 712/227 |
| 6,094,729 | * 7/2000 | Mann | 714/25 |

* cited by examiner

Primary Examiner—Meng-Ai T. An
Assistant Examiner—Nabil El-Hady

(74) Attorney, Agent, or Firm—Stroock & Stroock & Lavan LLP

(57) ABSTRACT

A system for debugging the computer program present in read-only memory (ROM) contains a debugger, a processor, read-only memory, a bus and a hardware debugging support module. The hardware debugging support module contains a first register called the range start register, a second register called the range end register and a comparator. The debugger uses a list of "n" user specified break points to divide a computer program into "n+1" regions, each of which has a start address and an end address. The first register and the second register of the hardware debugging support module are programmed with the start address and end address of a region which contains a specific address. The comparator is connected to the first register and second register of the hardware debugging support module and is also connected to the bus which connects the read-only memory to the processor. The comparator monitors addresses traveling on the bus and causes the hardware debugging support module to interrupt the processor and transfer control of the computer program to the debugger if a specific address traveling on the bus does not fall within the range defined by the first register and the second register. The debugger then searches the remaining "n+1" regions to see if the specific address lies within a second region. If such a region is found, then the start address and end address of that second region are entered into the first register and the second register and the computer program is run. However, if such a region is not found, then the computer program has reached a break point and the debugger transfers control of the program to the user. The computer program can then be single stepped to execute the instruction at which the break point was placed to obtain an output address. The start address and end address of the region that contain this output address are programmed into the first register and the second register and the computer program is run. This process is repeated until the entire computer program has been executed.

10 Claims, 2 Drawing Sheets

SYSTEM FOR DEBUGGING (N) BREAK POINTS BY DIVIDING A COMPUTER PROGRAM TO (N+1) REGIONS EACH CONTAINS NO BREAK POINT AND USING TWO REGISTERS TO DEFINE THE START AND END ADDRESSES OF EACH REGION

FIELD OF THE INVENTION

This invention relates generally to the field of software debugging programs, and specifically to a new technique to increase the number of break points that can be implemented in read only memories (ROM).

BACKGROUND OF INVENTION

In order to develop software, it is important to have debugging tools to find bugs or errors in the software. One of the important features of a debugger is the ability to set break points on an instruction and get control of the computer program to examine its state when the flow of control of the program reaches the break point. Typical computer systems or peripheral debug diagnostic systems, for example, logic analyzers, implement break points by using individual registers. A register is a memory element storing a plurality of bits. Each bit in the register can be a logical 0 or a logical 1, as is common in digital computer systems. Thus, the break point is defined by a bit pattern of logical 0's and logical 1's called a break point code, which is stored in the register. In general, a debugger is expected to support multiple break points since there might be multiple points of interest to the user. To implement break points, the user first specifies an address (A) to the debugger where the program must break in order to activate the break point. The debugger then replaces the software instruction at address (A) with a break instruction.

Subsequently, during the execution of the computer program, if the break instruction is executed, control is transferred to the debugger which either prints a message or waits for user input. This transfer of control allows a computer operator to then scrutinize various contents of the computer system to examine if the computer system is in a proper state at the time of recognition, that is, at the break point. When the program execution needs to be continued, the break point instruction is replaced with the actual instruction which had originally been present in the computer program. This approach works well when the program to be debugged exists in a memory location which can be written to by the user. However, in embedded systems, the computer program usually resides in read-only memory (ROM), which cannot be written to by the user. Thus, the above approach of replacing the instruction at the break point with a break point instruction is not possible.

One prior art approach of debugging programs in ROM is to always single step the program, as known in the art, and compare the address of the instruction to be executed with a previously-specified list of break points set by the user. Using this approach, any number of break points can be supported in the debugging program without the need for any extra hardware support. However, this single-step approach is rarely used because it is extremely slow. The execution time of the program in a debugging mode is several orders of magnitude slower than the actual program which makes for a very unpleasant debugging experience.

A second alternate prior art approach to debug computer programs that are present in ROM is to provide additional hardware to support break points in ROM. This approach has been used by embedded processors like the ARM, Lucent 1600, Lucent 16000, TI C54X, etc. embedded processors.

Reference is now made to FIG. 1 which depicts an example of the second prior art approach to debug computer programs that are present in ROM by providing additional hardware to support break points in ROM. In the prior art, a hardware debugging support module 5 consists of a break point address list 7 and a comparator 6 as shown in FIG. 1. The output of break point address list 7 is connected to comparator 6 within hardware debugging support module 5. Comparator 6 taps into address bus 14 which transfers information between processor 12 and memory 10 of the computer system. A predetermined user defined list of break point addresses is stored in break point address list 7. When hardware debugging support module 5 is in operation, comparator 6 compares the actual condition existing on address bus 14, i.e., the address being passed between processor 12 and memory 10, with the list of addresses that are stored in break point address list 7. When comparator 6 finds a match between a signal on address bus 14 and an address stored in break point address list 7, comparator 6 signals that a break point has been recognized, and hardware debugging support module 5 interrupts processor 12 and transfers control to the debugger. Since the comparison performed by comparator 6 must be done at the speed of processor 12 and the silicon resources needed for storing the list of break point addresses in break point address list 7 is large, prior art processors limit break points to an extremely small and finite number. Generally, only one breakpoint address can be loaded into one of the registers at any one time. Thus, to implement a plurality of break points requires a plurality of break point registers which increases the complexity and cost of the hardware. Generally, break point address list 7 is implemented using one or two registers, thereby limiting the debugger to the use of only one or two break points. Thus, it is desirable to provide for a new technique that allows for the placement of a greater number of break points in ROM with a finite amount of hardware resources.

SUMMARY OF THE INVENTION

The present invention is directed at overcoming the shortcomings of the prior art. Generally speaking, in accordance with the present invention, a system for debugging a computer program, present in read-only memory (ROM) comprises a debugger, a processor, read-only memory, a hardware debugging support module and a bus.

The debugger has a list of "n" user specified break points which it uses to divide a computer program that needs to be debugged into "n+1" regions. Each of these regions has a start address and an end address. The read-only memory is connected to the processor by the bus.

The hardware debugging support module comprises a first register called the range start register, a second register called the range end register and a comparator. The first register contains the start address of a selected region from the "n+1" regions, whereas the second register contains the end address of the selected region. Thus, the first register and the second register define a range of address locations for the computer program. The comparator is connected to the bus, the first register and the second register and monitors addresses traveling on the bus. The hardware debugging support module interrupts the processor and transfers control to the debugger if a specific address on the bus does not fall within the range defined by the first register and the second register. When a specific address on the bus does not fall within the range, the debugger performs a search on the remaining "n+1" regions to see if that specific address lies in any one of those regions. If such a region is found, then the start address and end address of this second region are programmed into the first register and the second register of the hardware debugging support module. However, if the specific address is not found to lie within any of the remaining "n+1" regions, then the debugger transfers control of the computer program to the user because the computer program has reached a break point. The user can now scrutinize the computer program at the break point.

To continue debugging the computer program, after the computer program hits a break point, the comparator is disabled and the computer program is single stepped to execute the instruction at which the break point had been placed. The debugger then performs a search on the remaining "n+1" regions by using the output address obtained as a result of the single-stepping process to determine the region which contains this output address. The start address and end address of this third region are then programmed into the first register and the second register of the hardware debugging support module. The comparator is then enabled and the computer program is run until it hits another break point. The debugger repeats the single-stepping process, the search for the location of the resultant output address and the programming of the start and end addresses of the resultant region in the first register and second register of the hardware debugging support module until the entire computer program has been executed.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
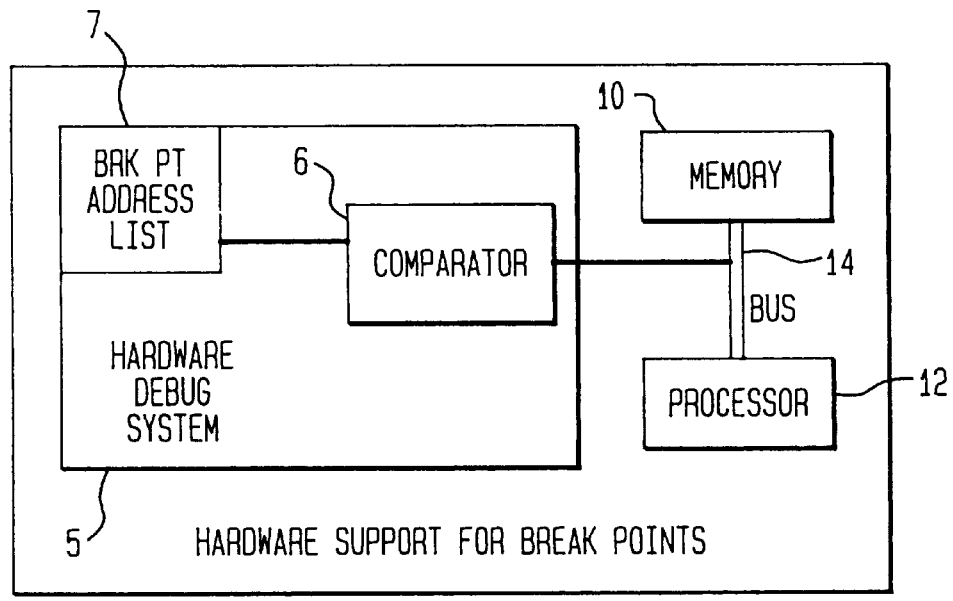
FIG. 1 is a schematic diagram of an implementation of hardware to support break points in ROM constructed in accordance with the prior art.
Figure 2:
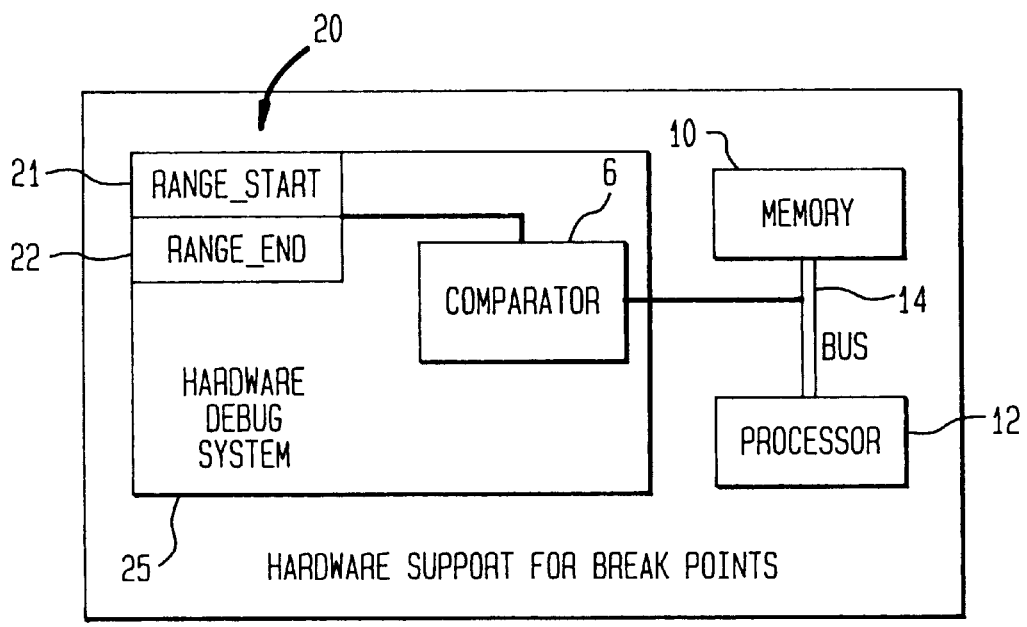
FIG. 2 is a schematic diagram of an implementation of hardware to support break points in ROM constructed in accordance with the present invention.

Reference is first made to FIG. 2, which depicts a hardware debugging support module 25, constructed in accordance with the present invention. Hardware debugging support module 25 includes a comparator 6 and two registers generally indicated as 20. Registers 20 include a first register called the range start register 21 and a second register called the range end register 22 which are connected to comparator 6 within hardware debugging support module 25. Comparator 6 is tapped into address bus 14 which connects processor 12 with memory 10. Whenever there is an address going across address bus 14 between memory 10 and processor 12, comparator 6 of hardware debugging support module 25 checks to see if that specific address lies within the range specified by range start register 21 and range end register 22. If the address is not within this range, hardware debugging support module 25 interrupts processor 12 and control over the program is transferred to the debugger.

Figure 3:
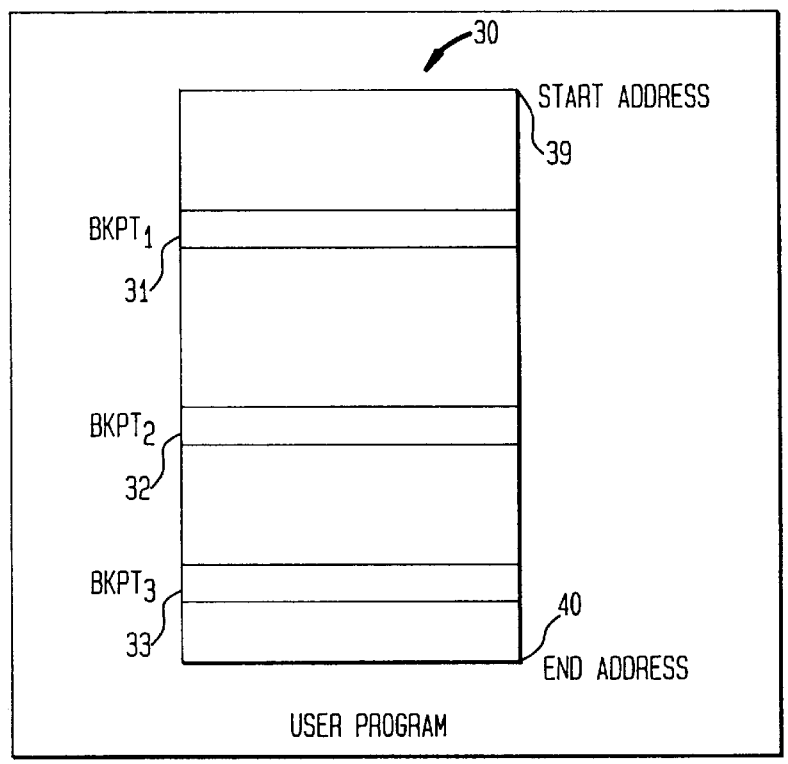
FIG. 3 is a tabular representation of a computer program depicting the break points in ROM in accordance with the present invention.

The debugger stores all the user-specified break points ($Bkpt_i$ i=1...n) in a list. Reference is now made to FIG. 3 which depicts a representational view of a computer program with break points in a program address list generally indicated as 30. Program address list 30 includes three user-specified break points, break point 1 ($Bkpt_1$) 31, break point 2 ($Bkpt_2$) 32 and break point 3 ($Bkpt_3$) 33. Program address list 30 also includes a start address 39 and an end address 40.

When a user directs the debugger to start execution of a computer program and begin the debugging process, the debugger begins by dividing the computer program into a list of (n+1) regions (($s_i$, $e_i$), i=1, n+1) where:

$s_i$ is start address 39;

$e_n$ is end address 40;

$s_i = (Bkpt_{i-1}+1)$ i=2, ... ,n+1

$e_i = (Bkpt_i-1)$ i=1, ... ,n and n is the number of user-specified break points.

Thus, in FIG. 3 because the user has specified three break points, the debugger will divide the computer program into four regions separated by the three break points.

Figure 4:
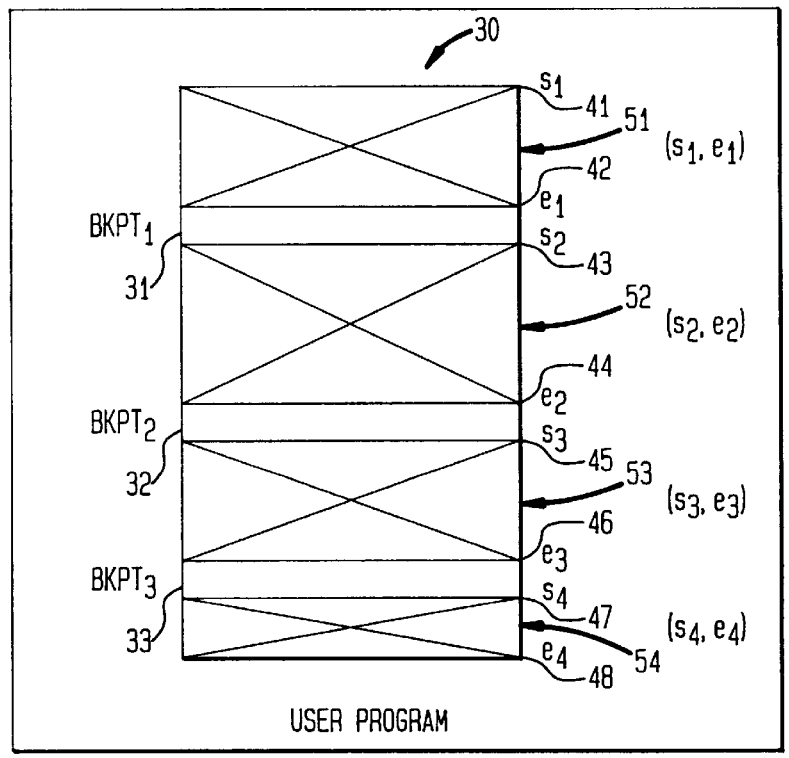
FIG. 4 is a tabular representation of a computer program depicting the start and end addresses of the debugger generated regions for the computer program in ROM in accordance with the present invention.

Reference is now made to FIG. 4 which depicts a view of the computer program of FIG. 3 with three user-defined break points. Program address list 30 of the computer program includes four regions, region 1 51, region 2 52, region 3 53 and region 4 54 separated by three break points, break point 1 31, break point 2 32 and break point 3 33. Region 1 51, depicted in FIG. 4 as ($s_1$, $e_1$), has a start address $s_1$ 41 and an end address $e_1$ 42. Start address $s_1$ 41 is the same address as program start address 39. Region 2 52, depicted in FIG. 4 as ($s_2$, $e_2$), has a start address $s_2$ 43 and an end address $e_2$ 44. Region 3 53, depicted in FIG. 4 as ($s_3$, $e_3$), has a start address $s_3$ 45 and an end address $e_3$ 46. Similarly, region 4 54, depicted in FIG. 4 as ($s_4$, $e_4$), has a start address $s_4$ 47 and an end address $e_4$ 48. End address $e_4$ 48 is the same address as program end address 40. Break point 1 31 lies between end address $e_1$ 42 of region 1 51 and start address $s_2$ 43 of region 2 52. Break point 2 32 lies between end address $e_2$ 44 of region 2 52 and start address $s_3$ 45 of region 3 53. Similarly, break point 3 33 lies between end address $e_3$ 46 of region 3 53 and start address $s_4$ 47 of region 4 54.

After dividing the computer program into the above-mentioned regions, the debugger proceeds by identifying the region of the computer program that the starting address of the program lies in and then enters the start address and end address values of that region into range start register 21 and range end register 22. For example, if the starting address of the computer program lies within region 1 51, the debugger identifies region 1 51 of the program and enters start address $s_1$ 41 into range start register 21 and end address $e_1$ 42 into range end register 22. The debugger then allows the computer program to run. While the program is running, control of the program is transferred from the debugger to processor 12. Comparator 6 of hardware debugging support module 25 keeps checking the addresses on address bus 14 to determine if an address falls out of the range specified by range start register 21 and range end register 22. If the program control falls out of the range defined by range start register 21 and range end register 22, i.e., the address on address bus 14 does not lie in the range specified by range start register 21 and range end register 22, hardware debugging support module 25 raises an interrupt and transfers control of the computer program to the debugger. At this point, since the address found by comparator 6 does not lie within region 1 51, the debugger computes a new region by performing a binary search through the list of the remaining regions, in this case, region 2 52, region 3 53 and region 4 54. If the address found by comparator 6 is found to lie within a new existing region, then the debugger programs range start register 21 and range end register 22 with the start address and end address of the new program region and lets the program execution continue. Thus, if the address found by comparator 6 is found to lie within region 2 52, the debugger will enter start address $s_2$ 43 of region 2 52 into range start register 21 and end address $e_2$ 44 of region 2 52 into range end register 22. Program execution then continues until control falls out of region 2 52.

Alternatively, if the address found by comparator 6 is not found to lie in any new region, then the computer program has hit a break point and the debugger outputs an appropriate message and transfers control to the user. The user is then able to examine the computer program and analyze the operation of the program till the breakpoint. If desired, this message can be saved in a list on a computer file. Clearly, this is a matter of design choice and the debugger could print the message on the console screen or an attached printer. The message may include, for example, information with regard to all the routines which were executed by the computer program prior to its hitting a break point, the number of times each of these routines was entered and the number of processor cycles for each specific routine. In alternate embodiments, other information may also be gathered, such as the number of sub-routines executed by the computer program prior to hitting a break point.

When execution of the computer program needs to be resumed after hitting a break point, the comparator of hardware debugging support module 25 is first disabled. Processor 12 is then single stepped, as known in the art, to execute the instruction at which the break point was placed. The output address obtained after executing the instruction which had been replaced by the break point is used to perform a binary search over the list of regions to identify the region of the program that this particular output address of the program lies in. The comparator of hardware debugging support module 25 is then enabled and range start register 21 and range end register 22 are programmed with the start address and end address of the new region. Thus, for example, if the computer program hits break point 1 31, then the address obtained by comparator 6 lies between end address en 42 of region 1 51 and start address $s_2$ 43 of region 2 52. The comparator of hardware debugging support module 25 is disabled and processor 12 is single stepped to execute the instruction at break point 1 31. The output address obtained by comparator 6 is used to perform a binary search over the list of regions. If the output address is found to lie in region 3 53, then start address $s_3$ 45 is entered into range start register 21 and end address $e_3$ 46 is entered into range end register 22, the comparator of hardware debugging support module 25 is enabled and the computer program is allowed to run again. This process is repeated until the entire computer program has been executed. If the user wants to set new break points during the execution of the computer program, the debugger will have to recompute the region list.

By providing for a range start register 21 and a range end register 22 that define a range of addresses within hardware debugging support module 25 and the enhanced debugging techniques, the present invention provides the ability to support an arbitrary number of break points with limited amounts of hardware resources being required. The execution of the computer program while it is being debugged in accordance with the present invention is considerably faster than the single-stepping solution used in the prior art. The present invention is particularly well suited to the situation where limited hardware resources are to be used in the debugging process.

The person of skill, utilizing the teaching of the present invention, will recognize that there are alternate ways to carry out the logic described herein, for example by modifying the number of break points, specifying other information to be collected and printed by the debugger, etc., all as a matter of application specific design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of debugging a computer program present in read only memory (ROM) comprising the steps of:

specifying a list of "n" break points to a debugger, where "n" represents the number of specified break points by a user;

dividing said computer program into "n+1" regions when the user begins operation of said debugger, each one of said "n+1" regions having a start address and an end address wherein said start address ($s_i$) can be represented by the equation:

$$s_i = (Bkpt_{i-1}+1) i=2, \ldots, n+1 \text{ and}$$

said end address ($e_i$) can be represented by the equation:

$$e_i = (Bkpt_i - 1) i=1, \ldots, n$$

where the start address $s_1$ is the same as the computer program start address, and the end address $e_{n+1}$ is the same as the computer program end address;

determining the starting address of said computer program;

determining a first region of said "n+1" regions that contains said computer program starting address;

entering said start address of said first region into a first register of a hardware debugging support module and said end address of said first region into a second register of said hardware debugging support module, said first register and said second register defining a range of address locations for said computer program located in said first region;

running said computer program by transferring control of said computer program to a processor;

monitoring addresses with a comparator that forms a part of said hardware debugging support module, said addresses traveling on a bus, said bus connecting said processor and a read only memory, said comparator being connected to said bus, said first register and said second register;

interrupting said processor and transferring control to said debugger if a specific address on said bus does not fall within said range;

searching the remaining of said "n+1" regions to determine a second region of said "n+1" regions where said specific address is contained;

programming said start address of said second region into said first register of said hardware debugging support module and said end address of said second region into said second register of said hardware debugging support module;

running said computer program by transferring control of said computer program to the processor;

repeating said transferring, monitoring, interrupting, searching and programming until said specific address is not contained within any of said "n+1" regions indicating that said computer program has reached a break point; and transferring control of said computer program to said user when said computer program has reached said break point.

2. The method of debugging a computer program present in read only memory (ROM) of claim 1 further comprising the steps of:

disabling said comparator when said computer program reaches said break point;

executing the instruction at which said break point was placed to obtain an output address, said execution being performed by a single stepping process;

searching the remaining of said "n+1" regions to determine a third region of said "n+1" regions where said output address is contained;

programming said start address of said third region into said first register of said hardware debugging support module and said end address of said third region into said second register of said hardware debugging support module;

enabling said comparator;

running said computer program by transferring control of said computer program to the processor;

repeating said disabling, executing, searching, programming, enabling and running until the entire said computer program has been executed.

3. The method of debugging a computer program present in read only memory (ROM) of claim 1 wherein said searching of said remaining "n+1" regions is performed by doing a binary search.

4. The method of debugging a computer program present in read only memory (ROM) of claim 1 wherein said debugger outputs a message when said computer program reaches a break point.

5. The method of debugging a computer program present in read only memory (ROM) of claim 2 wherein said debugger recomputes said "n+1" regions if new break points are added to the list of break points during execution of said computer program.

6. A system for debugging a computer program present in read only memory (ROM) comprising:

a debugger having a list of "n" user specified break points, said debugger dividing said computer program into "n+1" regions when a user begins operation of said debugger, each one of said "n+1" regions having a start address and an end address wherein said start address ($s_i$) can be represented by the equation:

$$s_i = (Bkpt_{i-1}+1) i=2, \ldots, n+1 \text{ and}$$

said end address ($e_i$) can be represented by the equation:

$$e_i = (Bkpt_i - 1) i=1, \ldots, n$$

where the start address $s_i$ is the same as the computer program start address, and the end address $e_{n+1}$ is the same as the computer program end address, said debugger determining the starting address of said computer program and a first region of said "n+1" regions that contains said starting address;

a processor;

read only memory connected to said processor by a bus;

a hardware debugging support module comprising:

a first register and a second register, said first register and said second register defining a range of address locations for said computer program wherein said first register contains said start address and said second register contains said end address of said first region of said "n+1" regions;

a comparator for monitoring addresses traveling on said bus, said comparator being connected to said first register and said second register;

said hardware debugging support module interrupting said processor and transferring control of said computer program to said debugger if a specific address on said bus does not fall within said range of address locations defined by said first register and said second register;

said debugger performing a search on theremaining of said "n+1" regions to determine a second region of said "n+1" regions where said specific address is contained and then programming said start address of said second region into said first register of said hardware debugging support module and said end address of said second region into said second register of said hardware debugging support module; and said debugger transferring control of said computer program to said user when said computer program has reached a break point wherein said specific address is not contained within any of said "n+1" regions.

7. The system for debugging a computer program present in read only memory (ROM) of claim 6 wherein:

said comparator is disabled when said computer program reaches said break point;

said computer program uses a single step process to execute the instruction at which said break point was placed to obtain an output address;

said debugger performing a search on the remaining of said "n+1" regions to determine a third region of said "n+1" regions where said specific address is contained and then programming said start address of said third region into said first register of said hardware debugging support module and said end address of said third region into said second register of said hardware debugging support module;

said comparator is enabled and the computer program is run by transferring control of said computer program to the processor; and said debugger repeats said single step process, said search and said programming until the entire said computer program has been executed.

8. The system for debugging a computer program present in read only memory (ROM) of claim 6 wherein said searching of said remaining "n+1" regions is performed by doing a binary search.

9. The system for debugging a computer program present in read only memory (ROM) of claim 6 wherein said debugger outputs a message when said computer program reaches a break point.

10. The system for debugging a computer program present in read only memory (ROM) of claim 7 wherein said debugger recomputes said "n+1" regions if new break points are added to the list of break points during execution of said computer program.

* * * * *